Aug. 18, 1953     P. H. SOMMERS     2,648,974
MEANS TO FACILITATE THE LAYING OF MASONRY UNITS
Filed May 24, 1949     7 Sheets-Sheet 1

INVENTOR.
Paul H. Sommers
BY
Attys.

Aug. 18, 1953      P. H. SOMMERS      2,648,974
MEANS TO FACILITATE THE LAYING OF MASONRY UNITS
Filed May 24, 1949      7 Sheets-Sheet 2

INVENTOR.
Paul H. Sommers

Aug. 18, 1953 P. H. SOMMERS 2,648,974
MEANS TO FACILITATE THE LAYING OF MASONRY UNITS
Filed May 24, 1949 7 Sheets-Sheet 3

INVENTOR.
Paul H. Sommers

Aug. 18, 1953     P. H. SOMMERS     2,648,974

MEANS TO FACILITATE THE LAYING OF MASONRY UNITS

Filed May 24, 1949     7 Sheets-Sheet 4

INVENTOR.
Paul H. Sommers
BY
Attys.

Aug. 18, 1953 P. H. SOMMERS 2,648,974
MEANS TO FACILITATE THE LAYING OF MASONRY UNITS
Filed May 24, 1949 7 Sheets-Sheet 5

INVENTOR.
Paul H. Sommers
BY
*Attys.*

Aug. 18, 1953  P. H. SOMMERS  2,648,974
MEANS TO FACILITATE THE LAYING OF MASONRY UNITS
Filed May 24, 1949  7 Sheets-Sheet 6

INVENTOR.
Paul H. Sommers

Aug. 18, 1953     P. H. SOMMERS     2,648,974
MEANS TO FACILITATE THE LAYING OF MASONRY UNITS
Filed May 24, 1949     7 Sheets-Sheet 7

INVENTOR.
Paul H. Sommers
BY
Attys.

Patented Aug. 18, 1953

2,648,974

UNITED STATES PATENT OFFICE 2,648,974

MEANS TO FACILITATE THE LAYING OF MASONRY UNITS

Paul H. Sommers, Montgomery, Ala.

Application May 24, 1949, Serial No. 95,126

21 Claims. (Cl. 72—129)

My invention relates to the art of masonry, and more particularly to that branch of the art which has to do with the laying into a wall of bricks, building blocks and the like, which I term masonry units.

The laying of masonry units, such as brick, into a wall, as at present practiced, involves the repetitious operation of disposing a masonry unit in a matrix of mortar (except at its exposed face or faces) upon a support which in the main is a course of previously laid units. An essential of a satisfactory structure is that each unit shall be located and maintained in a definite position in all three dimensions, so as to result in alignment with adjacent units and in level, horizontal lines and in plumb vertical lines with the exposed faces disposed substantially in a vertical plane or planes, and with such overall regularity as to provide a desired uniformity of surface texture or pattern.

The application of each bed or layer of mortar, and the spacing and laying of each brick is an opportunity for error which challenges the skill and judgment of the artisan, hence, the high degree of skill required to do satisfactory bricklaying or like masonry construction.

It has occurred to me that the principle of designing a machine which will reduce the manual operations required to perform a complex operation to such simplicity as to permit unskilled labor to accomplish that which now requires a high degree of manual skill, should be applicable to bricklaying and like masonry construction. In the development of this thought, I have, through observation and study, arrived at the conclusion that while one might conceivably construct a machine which would, by mechanical means or mechanism, perform the same specific acts which a skilled bricklayer performs, that approach will not yield a satisfactory solution of the problem. In brief, I concluded that bricklaying by a machine requiring only push-button control is not the right approach.

Analysis of the acts involved in bricklaying revealed to me the fact that the basic manual acts which are involved are relatively simple. Anyone, no matter how unskilled, can lay blocks side by side and pile them on top of each other. In fact, a very young child readily attains that degree of skill. To interpose a layer of mortar between successive courses, and to interpose mortar between individual bricks of a course, calls for no particular skill, and could be performed by any normal school boy. But without the skill of the artisan such a wall would be unacceptable. The requirement for skill appears to reside mainly in the attainment of uniformity of spacing of the bricks and in the alignment of their exposed edges and faces vertically and horizontally, and in maintaining a substantially uniform thickness of the wall, said requirements prevailing at each stage of erection of the structure.

I thereupon conceived the possibility of providing means for reducing the possible errors in laying bricks into a wall, in other words, of taking some or all of the skill out of the operation of laying masonry units into a wall by causing a machine or mechanical device to provide the guidance of operations required to be performed in the laying of such units into a wall, and thereby permit performance of those operations by an unskilled operator.

I conceived that by providing control of depth and width of the mortar bed, control of the position of each unit in the three dimensions, control of the spacing between adjacent units, control of the face alignment of the units relative to other units in a course, and in other courses, and control of the thickness of the wall at each successive stage of its erection, the manual operations would be so simplified that the skill of the artisan would not be required, and unskilled labor could satisfactorily lay bricks or other masonry units.

I further conceived that if a mechanical device for performing the above controls or guidance could be made so simple that it in turn could be applied and operated by unskilled labor, it would be possible to produce a substantial advance in the art with a corresponding benefit to the public. The present invention is designed to secure these desirable results.

In devising means to embody the above concepts, I realize that not all the controls above referred to would be required to be embodied in a device, if the operator could be depended upon to supply, by manual skill, those controls omitted from the machine. Thus, for example, if the device supplied the guidance for laying the bricks with all their exposed front faces in a vertical plane and no more, it could be a very simple device, but it would be very useful. To add to that the guidance of the bricks in a horizontal line in each course, would require an organization of means of a somewhat higher order, and so successively, as each additional function of guidance is to be performed, a higher degree of organization of the device is required.

In considering the base of reference relative to which the controls or guidance must be exercised, it became apparent to me that the same fixed base of reference for all operations was impractical, as it would require a mechanism of prohibitive complexity, whereas, my objective is a machine or device of great simplicity, of a high degree of portability, of low weight, of low cost, and easy to operate. I thereupon decided that these objectives could only be obtained by utilizing a shifting base of reference, and that this might well be a previously erected part of the structure. With this concept of a shiftable base of reference for the guidance or control functions to be performed by the device, the problem of means simplified itself greatly in my mind.

I conceived that by the mounting of the device upon the wall itself, and using for reference a previously laid course, and preferably a part of the course currently being laid, and with the aid of spirit levels to provide absolute reference in the horizontal and vertical, I could embody, in a single simple device, all the controls essential to laying up by an operator of a low degree of skill or substantially no skill at all, a wall equal to that which could be done without my device only by a highly skilled bricklayer.

The essential concept of means employed to embody my invention is a generally planar face plate having means by which it is adapted to be supported on the wall, said means being readily releasable means, and said plate being aligned against a previously laid course, and preferably also against a part of the course being currently laid. This provides a continuous guidance of bringing all of the exposed faces of the bricks on the side of the wall upon which it operates into a common plane. The principle involved is that the controlled plane may be indefinitely extended by moving the face plate edgewise in its own plane. To insure that this plane is vertical, recourse may be had to a spirit level which may be carried by the device or to a plumb bob or line. Variations of the mode of supplying the gauging or guidance will be apparent from the following specification in which specific operations are explained in more detail.

Upon this basic organization of a laterally movable face plate, I superpose a control of the location of the upper edges of the bricks of the course being currently laid which face the face plate, that is, the front of the wall. The means which performs this function is provided by forming the face plate with a straight horizontal upper edge, and disposing that edge a definite distance above the edges of the bricks of the previously laid course. It falls automatically into alignment with the edges of the previously laid bricks of the course currently being laid. To check the accuracy in horizontal alignment of this edge, recourse may be had to a spirit level which may be carried on the device. Transverse horizontal alignment of the top face of the masonry unit may be similarly provided.

The supporting means of this basic organization may take various forms. In an elementary embodiment of my invention, this means is provided by a pair of straps, one at each end of the face plate, adapted to reach horizontally across the wall and having downwardly extending ends which hook over the back edge of bricks previously laid. One of these straps, namely, the one at the forward end in the direction of constructing the wall, is disposed at a level to rest upon the bricks of the previously laid course. The other, namely, the one at the rear end of the device, is disposed at the level of the bricks laid in the course currently being laid. Hence, when these straps are properly disposed, the face plate is supported with its generally planar face in the plane of the face of the wall and any extension thereof, and the aforesaid upper edge horizontally disposed in proper position which brings it into alignment with the upper outer edges of the bricks just laid in the course currently being laid.

In the embodiments of my invention herein claimed, the face plate may be provided with a horizontal bead adjacent its lower edge and the face plate held with its planar face in alignment with the faces of the bricks previously laid both in the previous course and in the course being currently laid, and with the bead resting upon the upper outer edges of the bricks in the course previously laid.

This bead may be employed as a gauge for the depth of the horizontal layer of mortar between courses, and it provides a recessed or undercut mortar joint. This bead may also serve to guide the vertical position of the units being laid.

The face plate may have vertical beads spaced at the mortar joints between bricks which are to be laid as facing bricks, and to serve as forms for the filling in with mortar of the vertical joints between bricks or other units in a course.

Such a single face plate with horizontal beading may be employed with suitable reaches resting upon the bricks in the previously laid course, and in the course being currently laid, but it requires lateral release in order to clear the undercut or recessed mortar joints. The plate may then be advanced to an advance position where one or more of the vertical beads registers with a vertical joint or edge of a unit and the horizontal bead rests upon or at the edges of the course previously laid.

However, in the preferred embodiment of the present invention, a face plate is provided on the inside of the wall. The device will thereupon supply guidance for not only the face bricks, but the bricks on the inner side of the wall as well. Also it may serve on each side as a retainer or form for the layer of mortar between courses and as a retainer or form for mortar on each side in the vertical joints between bricks in each course.

The mechanism for opening one or both of the plates to release the device from the units engaged and for again closing and locking them, as when moving the device into advanced position may take various forms. Toggle means, a concave snap action strip, cam means or any other similar mechanism which constitutes a collapsible connection which is self-locking when the plates are closed may be employed. Obviously, other mechanism provided with locking means that is not self-locking could be used, but not so conveniently. Opening and closing means which may be locked in a desired position manually may be employed in connection with plain flat plates as well as with beaded plates. The action of closing the plates, optionally may be applied at various stages of the operation within the scope of my invention.

The device may be adapted to the laying of any usual form of wall from a single thickness four inch wall to any greater thickness. It may be applied to composite walls or to walls made of unusual or odd sizes of masonry units. It is adapted to use in connection with hollow building blocks or other specially constructed masonry units. It may be employed for brick veneer walls tied to wood or concrete inside walls. In fact, all of the usual types of masonry walls may be erected by the aid of my device. In a special form of my device, a prefabricated lintel may be constructed. This may be made of bricks or other masonry units throughout, or it may be a composite reenforced concrete and masonry unit construction.

In another mode of use, the device of my invention may be employed as a gang layer of bricks into a course.

Now in order to acquaint those skilled in the art with the manner of constructing and utilizing my invention, I shall describe, in connection with the accompanying drawings, a specific form of my invention and its mode of use.

In the drawings.

Throughout the aforesaid drawings like reference numerals indicate like parts.

The device shown in Figures 1 to 8, inclusive, provides guidance to assure the required alignment, leveling, jointing and gauging of the masonry units, as well as providing confinement for the mortar in which the masonry is embedded. This specific device is suitable for laying bricks of standard dimensions into an 8" wall. One such standard size is 2⅛ x 3¾ x 8". There are two oblong side plates 1 and 2 consisting of thin generally rectangular sheets of metal suitably formed. At its upper horizontal edge the sheet 1 is provided with a horizontal flange 3 formed at right angles to the vertical plane of the plate. Similarly plate 2 has its vertical margin formed into a horizontally extending plate 4. Instead of integral flanges separate reenforcement may be employed. At its lower edge the plate 1 has a relatively narrow flange 5 disposed diagonally downwardly at approximately 45°. The plate 2 likewise has its lower edge flanged as at 6. The purpose of this flange is chiefly to stiffen the lower edge of the plate, but it serves also to guide the corresponding plate. The upper flange in each case not only stiffens the plate but also serves as a guiding or gauging edge for the leveling of the tops of the bricks in the course under construction. The plate 1 has a series of vertical beads 7, in this case four in number, secured on the inside surface of the plate. The plate 2 has similar vertical beads 8 secured on its inner surface. They are also four in number, but are out of register with the beads 7 by half the length of a brick. In other words, the beads 7 and 8 are spaced apart lengthwise of the device by half a brick length so as to break the joints between the front and rear layers of bricks 9 and 10 shown in Figures 6 and 7. Each course is preferably offset half a brick length longitudinally of the wall, so as to give a stretching bond between courses.

Where cross bonding of the two sides of the wall is to be effected, bricks are laid with their 8" length crosswise of the plates 1 and 2, and then the beads 7 and 8 form spacers between alternative ends of adjacent pairs of bricks. The upper flanges 3 and 4 of the two plates are cut away at the ends to permit the flat, platelike arms 13 and 15 on the plate 1, and 14 and 16 on the plate 2, to be attached against the flat outer face of the web of each plate, for moving the plates in and out relative to each other, as will be described later. The web of the side plate 1 is formed with a longitudinal V-shaped bead 17 extending from end to end as by rolling a crease into the plate. Similarly, a longitudinal V-shaped bead 18 is formed throughout the length of the plate 2. These horizontal or longitudinal beads join the lower ends of the vertical V-shaped beads 7 and 8, respectively. These two sets of beads, together with the upper edges of the plates, define the position of the outer faces of bricks to be laid in the course under construction. The beads therefore determine and form closures for the spaces between bricks and these spaces are necessarily filled with mortar to construct the wall. The beads projecting inwardly inside the outer edges of the related bricks provide grooved or recessed joints in the mortar, and it will be apparent that, in order to disengage these beads from the grooves which they form, the plates are required to be moved laterally to effect disengagement. In the absence of the horizontal grooves 17, 18 the device could be lifted vertically to disengage the beads 7 and 8 from their grooves by merely sliding out of them. The arms on which the side plates 1 and 2 are mounted are hinged in pairs at the advance end which is at the left of Figure 1, and at the rear end, which is at the right of Figure 1, to a pair of reaches 19 and 20, respectively. The reach 19 is formed of a piece of stiff, flat metal stock with a horizontal body portion 21 having the ends thereof bent up at right angles to the body portion 21, as at 22 and 23, and provided with hinge eyes 24, 24 at their upper ends. The arms 13 and 14 have hinge lugs 25 intermediate their ends, and aligned with the hinge eyes 24 on the reach. Hinge pins are passed through the matching eyes and lugs to provide hinges between the ends of the reach and the two arms, such as 13, 14, with which the reach cooperates. The upper end of each arm 13, 14 is provided with hinge eyes 26, 26. Between the hinge eyes on the end of each arm there are disposed ends of levers 27 and 28, which form a toggle connected by a toggle pin 29. This toggle pin 29 is guided for vertical motion in a pair of slots 30, 30 in the vertical bracket 31 mounted on the corresponding reach. The bracket 31 is formed of a piece of strap metal bent into inverted U-shape with the lower ends of the legs turned outwardly at right angles to form mounting feet for mounting the same upon the horizontal portions 21 of the reaches 19 and 20, respectively. The longer toggle arm 27 is provided with a grip portion 32 adapted to be engaged by the thumb of the operator to break the toggle. A round bar 33, which may be of solid or tubular construction, has its ends fastened to the upturned portions 22, 23 of the corresponding reach, and it forms a grip or handle for the fingers of the operator. Thus the operator may grasp the handles 33, 33 in the fingers of the hand at each end and by depressing the grip 32 above the corresponding handle as by means of the thumb of the hand, the toggle may be broken and the hinge pin of the toggle depressed and guided in the groove 30, whereby the upper ends of the arms 13 and 14 will be pulled towards each other when the toggle is thus broken, and the side plates 1 and 2 swung outwardly, as indicated by the arrows in Figure 7. By said outward movement of the side plates, the horizontal beads 17, 18 and the vertical beads 7 and 8 will be disengaged from the grooves in the mortar joints, and the device may be freely lifted to be moved to the left as viewed in Figure 1, and reset in position for the laying of another group of bricks.

Figures 1, 2, 3:
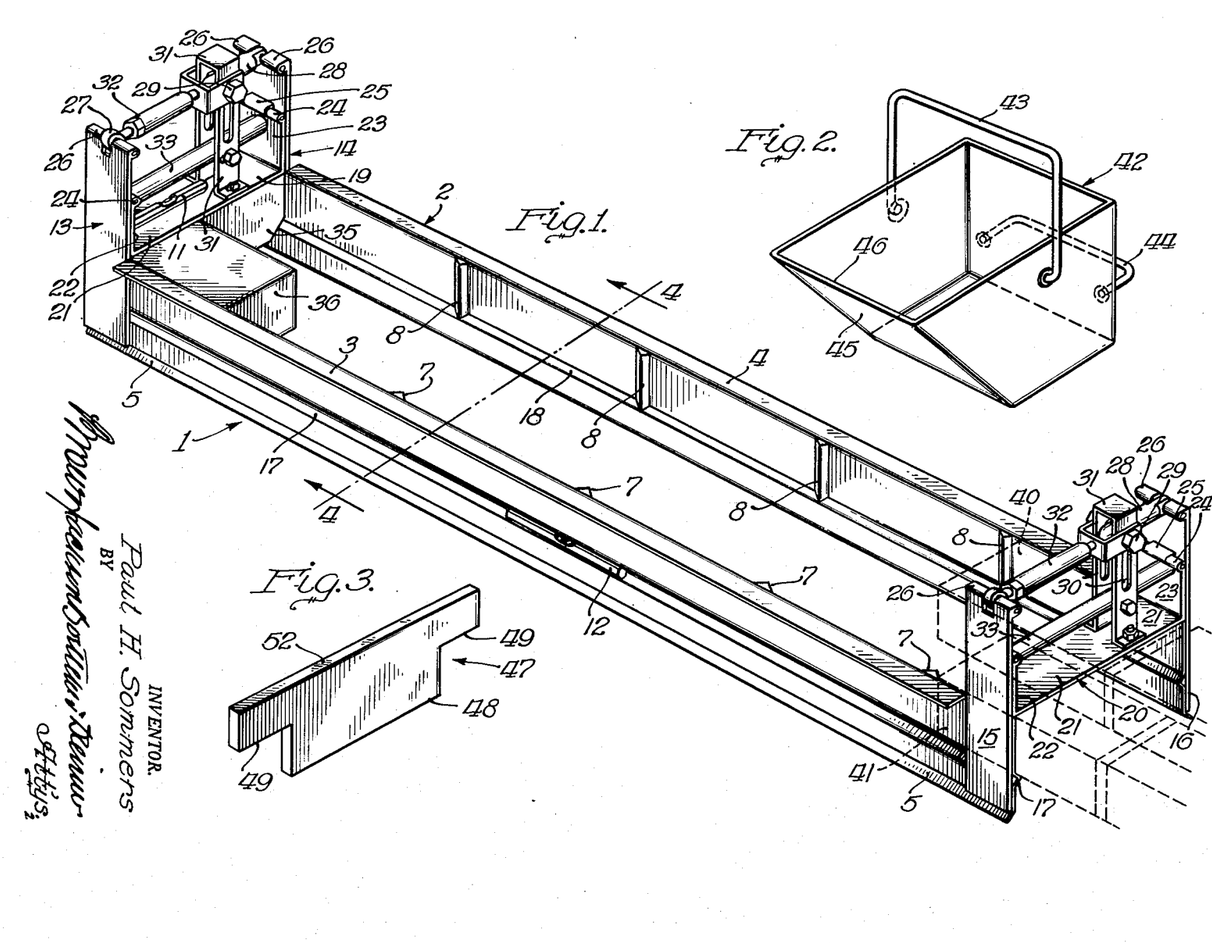
Figure 1 is an isometric view of an embodiment of my invention suitable for laying bricks in a single layer in an 8" wall.
Figure 2 is an isometric view of the bed mortar hopper for laying the right volumetric amount of mortar within the confines of the device shown in Figure 1 to secure a proper depth of the bed of mortar.
Figure 3 is an isometric view of the mortar bed screed and tamper.

At the advance end, illustrated at the left of Figure 1, an end plate or bulk head 35, and a displacer block 36, which may be hollow and formed of sheet metal, close off the end of the space between the plates to limit the flow of mortar in that direction when the mortar bed is initially laid. In the use of the device, assume that it is desired to start the laying of bricks into a wall upon the foundation 37, shown in Figure 8, the device of Figure 1 may be clamped upon the upper corners of the foundation, with the horizontal beads 17, 18 resting upon the upper outer corners of the said foundation to support the device in place. The right hand end of the device may be closed by a pair of bricks, initially laid in mortar as in starting at a corner, and thereupon the regular procedure of measuring out the correct amount of mortar for a mortar bed, and the laying of a predetermined number of bricks—in this specific instance, eight bricks—may proceed. Alternatively, a filler block and end wall may be removably placed in the right hand end of the device shown in Figure 1 for starting the new course.

Figure 9:
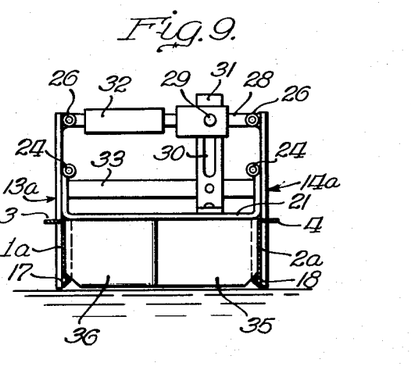
Figure 9 is a similar section of a form of the device as a special masonry course starter without extended side plates.

The laying of the first course of bricks on a flat slab or footing may be effected with the guidance of the device shown in my copending application, Serial Number 103,865, filed July 9, 1949, or by the use of the device shown in Figure 9 herein.

In Figure 1 I have shown in dotted lines the last two bricks, 40 and 41, laid in the course under construction. The brick 40 projects beyond the brick 41 by half the length of a brick, so as to secure breaking of the joints between the two rows. Now the spaces provided between the brick 40 and the bulkhead 35 at the opposite end is exactly that which is required for four additional bricks in that row, with the necessary joint space between them, which joint space is determined by the beads 8. Likewise, the space between the brick 41 and the filler 36 next to the plate 1 is just enough for four bricks in a row and end to end with space between them and the brick 41 for mortar for the joints, the width of the joints being predetermined by beads 7, 7. To initiate the laying of the bricks in these predetermined spaces, a layer of mortar of the proper depth is to be deposited on the previously laid course which forms the bottom of the enclosure which includes the side walls, which are the plates 1 and 2, and the end walls which are the bricks 40, 41 at the right hand end, and the bulkhead 35 and filler block 36 at the left hand end. The bulkhead 35 and filler block 36 constitute an offset end wall. The depth of this mortar bed should be just sufficient to cover the top edge of the horizontal beads 17 and 18. This volume of mortar is measured out by means of the hopper or bucket 42 shown in Figure 2.

Figure 4:
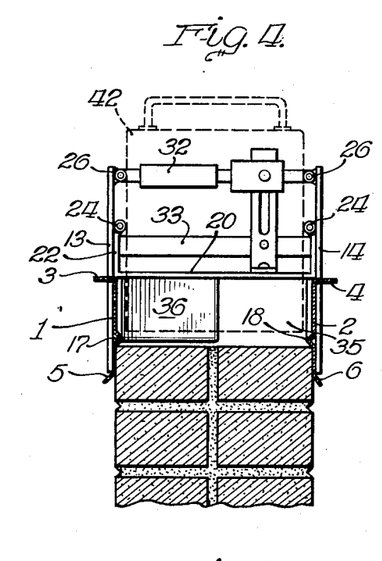
Figure 4 is a vertical cross section taken on the line 4—4 of Figure 1, showing in dotted lines the position of the hopper of Figure 2 for laying the mortar bed on a previously laid course of bricks.
Figure 5:
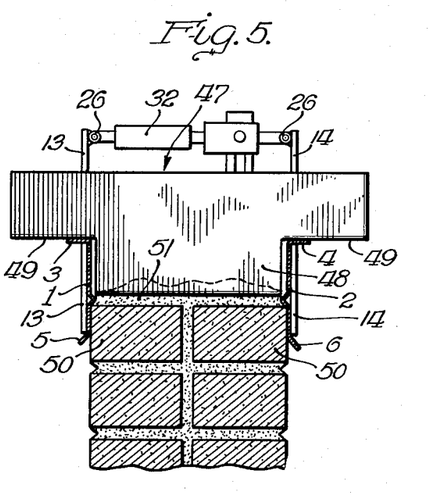
Figure 5 is a similar section showing the screed employed to level off the mortar bed.
Figure 6:
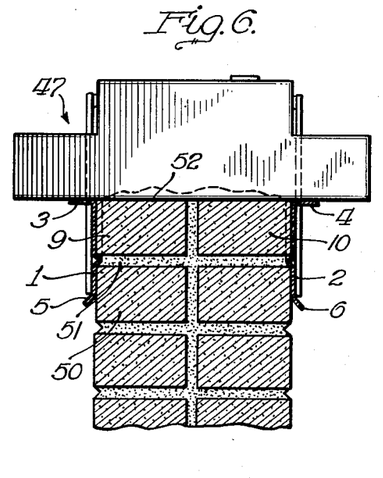
Figure 6 is a similar section showing the combination screed and tamper of Figure 3 employed to tamp the bricks level with the top edges of the device.
Figure 7:
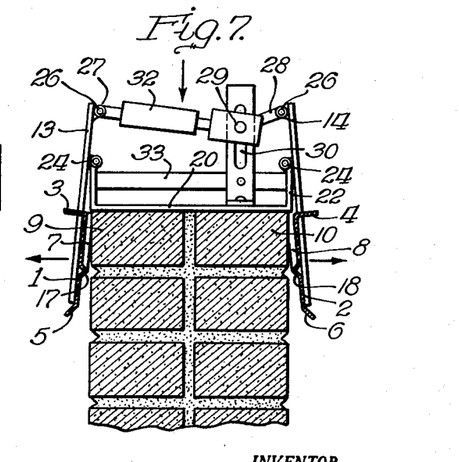
Figure 7 is a similar section on the line 4—4 showing the device operated to separate the face plates.
Figure 8:
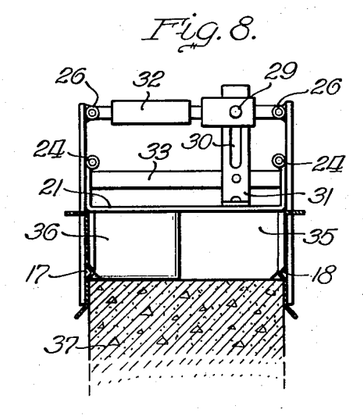
Figure 8 is a similar section of the device of Figure 1 showing the method of use for a starter course of masonry on a foundation.

The hopper 42 is provided with a bail 43 by which the filled bucket may be carried, and the handle 44 by which it may be tipped or otherwise manipulated. It may be provided with a single handle attached to its rear wall like a sugar scoop. This hopper, which is of generally prismatic form, has its front side 45 inclined to the vertical (for ease in emptying it) with a straight pouring edge 46. The bucket is filled with mortar, with the handle 43 folded down, and a shovel is used to strike off any excess, leaving the hopper exactly filled. It is then taken to the device, as shown in Figures 1 and 4, and the parallel sides of the bucket are interposed between the parallel sides of the plates 1 and 2 and mortar is poured out over the pouring edge 46 in as even a layer as may be readily obtainable, and the final amount deposited in the space between the bulkhead 35, the filler block 36, and the plate 2. With the mortar deposited on the course previously laid, even distribution may be made by means of the screed 47 which is used as shown in Figure 5 with the depending portion 48 disposed between the side plates 1 and 2 and the excess mortar is scraped back and forth to distribute the same evenly over the area defined. When the shoulders 49, 49 rest upon the flanges 3 and 4 of the side plates 1 and 2, as shown in Figure 5, the bottom edge of the screed falls short of the top of the previously laid course of bricks 50, 50, as shown in Figure 5, to provide the correct depth of mortar bed 51. The short 4" projection on the top edge may be employed in the 4" space between the block 36 and the sidewall 2. Thereupon the bricks are placed by hand in the spaces indicated by the beads 8, 8 on the back side of the device, and the beads 7, 7 on the front side of the device, with the final two bricks offset as shown at the left of Figure 1 for the previously laid batch. With the top edge 52 of the screed 47, which is now held in the reverse position as shown in Figure 6, the tops of the bricks 9 and 10 which have just been deposited may be forced down level with the flanges 3 and 4 to bring the top surface of these bricks to proper position and in a common horizontal plane. Any excess of mortar in the layer 51 is squeezed up into the vertical spaces between bricks. When the bricks have all been properly tamped down and leveled, a measured amount of mortar may then be deposited upon the batch just placed, and the vertical joints filled in. This filling operation may be facilitated by a trowel. Any excess of mortar may be struck off by means of the screed 47 or any other suitable straight edge. Thereupon the handles 33 are grasped with the fingers, and the grips 32 of the toggle levers depressed to open up the plates 1 and 2, as shown in Figure 7. Thereupon the device may be raised, and moved forward into a new position, as indicated, for the laying of an additional batch of eight bricks in the course under construction. While the specific device shown is adapted to receive a batch of eight bricks in two rows with offset joints front and rear, a larger or a smaller number may be employed, and the size of the units to be laid determines suitable dimensioning of the device. The device above described may be employed for the laying of eight bricks at a time in the course being currently laid when the same are laid transversely as for header bonding. The procedure is essentially the same.

The bulkhead wall 35 and filler block 36 are preferably constructed out of a suitably formed piece of sheet metal with a bottom wall which rests upon the course of bricks previously laid, whereas, the rear end of the device, that is, at the right of Figure 1, rests the flat bar 21 of the reach 20 upon the last two bricks laid in the course currently being laid. In other words, the bottom of the bulk head and filler block 35, 36 is disposed at a level lower than the cross bar 21 at the opposite end by a distance which is equal to the thickness of a layer of mortar and the thickness of a brick or such building block as is employed. It is to be observed that instead of resting the device upon the two reaches as above described it may be supported on the wall (or on the foundation at the start) by engagement of the longitudinal beads 17 and 18 upon the upper outer corners of the supporting wall or foundation.

Essentially, the above described device embodies the feature of a guiding plate and means for removably carrying it upon the wall or supporting surface disclosed in my copending application, Serial Number 93,078, filed May 13, 1949, now Patent No. 2,585,283, issued February 12, 1952. That is to say, in fundamentals the present device comprises a plate, such as the front plate 1 with means reaching across the wall to rest upon the top and preferably to engage the inner side of the wall for holding the plate 1 in guiding position. A specific improvement of that broad concept in the present case is the employment of the longitudinal bead 17 in the plate 1 (or in both plates) whereby there is required an opening up of the holding means so as to get the bead 17 out of the groove which it forms in order to free the device from the wall laid.

The holding means in the present case is the opposite plate 2, and in the preferred form of the device it is like the plate 1. However, it need not be so. In essentials, the second plate might be omitted, and the device held on the wall only by the arms and reaches, and a separation of the said holding means and the plate 1 to disengage the bead 17 from the groove established by it would be all that would be required to embody the broader features of the present invention. Another aspect of novelty of the present invention resides in the means by which such opening and closing action is obtained in a convenient and advantageous manner.

Viewed from another aspect, the plates 1 and 2 might, according to the present invention, be provided with completely flat faces or with only the vertical beads 7, 8 in the novel relation that they may be relatively spread apart to facilitate lifting of the device, and may be brought together and locked in position for the laying operation.

Also the present device embodies the novel concept of defining a definite area over which a predetermined volume of mortar may be spread to secure a predetermined thickness of the mortar bed.

Alternatively, the beads 17, 18 provide a depth gauge for the depth of mortar bed where the entire area is not to be utilized, and hence volumetric measurement is inapplicable.

While I have above described the preferred embodiment it is to be understood that the present invention is applicable to a wide variety of situations and requirements for the laying of bricks into a wall, and I shall describe hereinafter certain modified embodiments of the invention, certain ones of which are for specialized purposes, or for particular situations or for variations in the masonry units to be laid.

Figure 9 shows a form of the device for starting the laying of bricks upon a flat surface, as, for example, upon the ground or upon a concrete slab or the like. The side plates 1a and 2a extend down only to the bottoms of the beads 17, 18 and the arms which are connected to the side plates, such as the arms 13a and 14a at the advance end of the device, are all terminated substantially at the bottom of the beads 17 and 18, so that the device may rest entirely upon the lower edge of the side plates 1a and 2a, and upon the ends of the said arms upon which the side plates are mounted. In use, the side plates are locked in parallel relation, as shown in Figure 9, and rested upon the surface upon which bricks are to be laid, and a course may thereupon be laid. The right hand end of the device shown in Figure 9 will be like the left hand end illustrated, except that the end wall 35 and filler block 36 are preferably omitted at the right hand end and present at the left hand end. If desired, however, the right hand end of the device shown in Figure 9 may have the end wall and filler block supplied as a removable fitting, but a pair of bricks will serve as a temporary closure for that end. The device of Figure 9 may be employed for laying successive courses of bricks above the bricks in the lowermost course, because thereafter the filler block and end wall 35 will rest upon the course previously laid, whereas the transverse reach at the right hand end will rest upon the bricks previously laid in the course under construction. It is generally preferable, however, to have the plates extend below the edges of the previously laid course, and hence, after the device of Figure 9 has been used for laying the first course, resort may be had to a form of the device shown in Figure 1, and particularly illustrating in Figure 4 how the lower edges of the plates grip the bricks of the course previously laid. Extension attachments to continue the side plates below the beads 17, 18 may be provided.

Figure 10:
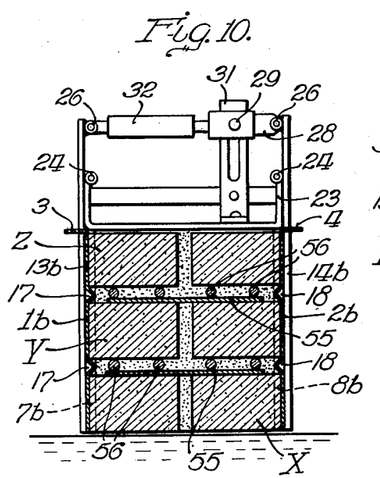
Figure 10 is a transverse section of a form of my device suitable for making a pre-cast masonry lintel.

To facilitate the construction of a building, lintels for the door and window openings may be preformed on the ground, and when the wall has been brought up to the point where they are needed, they may be hoisted into place as units, and the wall continued. Figure 10 shows an embodiment of my invention for forming a so-called pre-cast masonry lintel, which, in the construction of a brick wall, involves the laying of three courses of bricks with metal reenforcement between them. The device of Figure 10 comprises the usual reach at each end, and it may comprise a succession of filler blocks and bulkheads in reciprocal relation, so that the bricks in the course will break joints front and rear. Likewise, the bricks in adjacent courses will break joints to provide a stretching bond. The side plates 1b and 2b are mounted on arms 13b and 14b, pivoted at 24, 24 to the transverse reaches, and connected at their upper ends by a toggle mechanism which may be like that shown in Figure 1, or may be of any other preferred construction. The side plates 1b and 2b which are carried on these arms are of a height to span three courses. A front plate 13b has two longitudinal grooves 17, 17 for spacing the courses apart vertically, and the rear plate 2b likewise has two longitudinal grooves or longitudinal beads 18, 18 to space apart the courses at the back side of the lintel. In operating the device, it is set upon a flat surface and the lower course X is first laid, the bricks being located by means of the vertical beads shown in dotted lines 7b and 8b. These vertical beads space the bricks apart end to end in a course, and the beads of successive courses are offset a half brick length, as is appropriate for the stretching bond. The vertical joints are filled in with mortar, and then transverse strips or plates of sheet metal or wire 55 forming wall ties are laid on top of the lower course, and longitudinal reenforcing rods 56 are laid on top of the wall ties and a suitable depth of mortar bed is laid over the bricks in the course X, and the bricks in the course Y are then laid in the locations indicated for them by the beads, and end walls and filler blocks where the latter are provided. Instead of end walls and filler blocks, a plain flat end wall may be provided, and the ends of the courses all terminated on the same vertical plane by the use of half bricks. The vertical joints are next filled in with mortar for the course Y, and the bricks are tamped down to the proper level, which may be determined readily by a suitable tamping bar constructed like the screed and tamping bar in Figure 3. The second reenforcing plate 55 and reenforcing rods 56 are then put in place, a mortar bed deposited upon the same, the screed applied, the upper course of bricks Z is put in place, the vertical joints are filled in and the bricks in the course X are tamped to the proper level. The machine may thereupon be released by depressing the handle grip 32 to break the toggle and swing the arms and side plates outwardly to clear the grooves and disengage the device from the lintel thus formed. The lintel thus constructed is allowed to set a sufficient period of time to develop the strength of the mortar, whereupon the lintel may be handled as a unitary block.

The elements 55 constitute merely transverse wall ties and the rods 56 may consist of wire mesh, or a single layer of wire mesh may serve the purpose of the entire reenforcement and tie.

Figure 11:
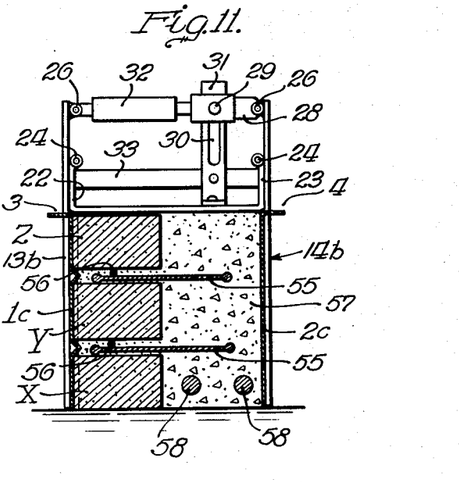
Figure 11 is a similar section of a form of the device for making a pre-cast masonry-concrete lintel.

In Figure 11 I have shown a form of device adapted to the formation of a combined brick and concrete pre-cast lintel. In this case the front plate 1c is substantially identical with the multiple brick height plate 1b of Figure 10. The back plate 2c is preferably a plain plate, since it is to serve merely as a retaining wall for concrete. Bricks in the courses X, Y and Z are laid against the front plate 1c with suitable filling of mortar between bricks to form the joints vertically and horizontally, and with the wall ties 55 and longitudinal reenforcement 56 disposed in place between the courses. The wall ties 55 extend out into the space which is later filled with poured concrete. Longitudinal reenforcement 58 in the lower part of the concrete filling provides the necessary reenforcement for the filling of concrete 57. In this form of the device, a suitable flat end wall is provided for the retention of the concrete, which is thus confined between the brick courses X, Y and Z at the front by the side plate 2c at the rear and by the end walls at each end. The device is retained in position long enough for the concrete 57 to set, whereupon the toggle may be broken, the side plates separated, and the device removed from the unit.

Figures 12, 13, 14:
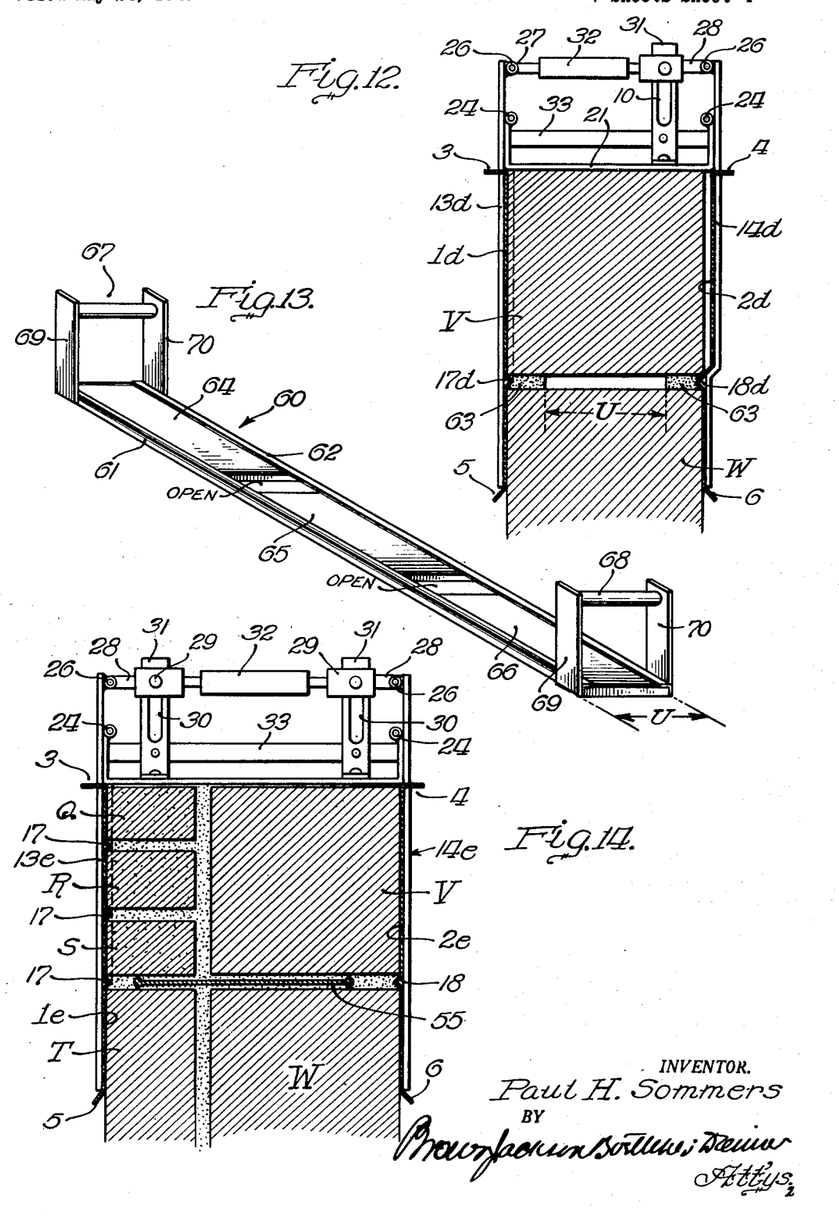
Figure 12 is an end view of a form of the device suitable for laying masonry blocks or tile.
Figure 13 is an isometric view of the mortar bed pan for use with the device shown in Figure 12.
Figure 14 is a cross sectional view of a device of my invention for laying a combination wall of block or tile on one side and brick on the other face thereof.

In Figure 12 I have shown the application of a modified form of my device to the laying of masonry blocks or tile.

The device in this case comprises the front plate 1d which is flanged at 3 at its upper end, and flared out at 5 at its lower end. A horizontal bead 17d is disposed at a level below the flange 3 a distance equal to the vertical height of the masonry block V, which is being laid. This plate is carried on an arm 13d, which extends a suitable distance below the bead 7d so as to grip the block W in the course previously laid and to align the block V with the block W. The back plate 2d is carried on an arm 14d which is offset about ¼" down to the level of the bead 8d to provide clearance for the handling of the masonry unit and the mortar bed pan of Figure 13. The mounting of the arms on the reach, and the provision of the toggle or other camming mechanism for locking the arms in place and for releasing and separating them is identical with the construction previously described, or may be such as is preferred. Blocks of this type are usually hollow blocks, such as concrete blocks or cinder blocks or tile. When the device is applied to the previously laid course of blocks W, the beads 17d and 18d project over the edges of the blocks W, and the reach at the rear of the device or at the right, as viewed in Figure 1, may rest upon a previously laid block, such as V, in the course of blocks being laid. An end plate, such as 35, may be employed to rest the advancing end of the device upon the previously laid course, although this may be omitted and dependence placed upon the resting of the beads 17d and 18d upon the edges of the blocks in the course previously laid.

When blocks V are to be laid, it is necessary first to lay the mortar bed and for assistance in doing this, the mortar bed pan shown in Figure 13 may be employed. This construction comprises a pair of side angles 61 and 62 of a depth substantially equal to the mortar bed 63, 63 shown in Figure 12. Closure plates 64, 65 and 66 are carried between the angles 61 and 62, leaving openings which register with the transverse webs of the blocks. The width of these openings will depend upon the solid transverse walls of the blocks, and the extent of the closures 64, 65 and 66 will depend upon the size of the openings in the blocks.

Handles 67 and 68 are attached by suitable vertical plates 69 and 70 joined to the outside of the angles 61 and 62. The structure of Figure 13 is relatively light. The angles have horizontal legs and vertical legs and are open at the bottom and the closure plates 64 are made of thin sheet metal with the edges flanged down, but present a smooth top surface. To lay the bed of mortar, the pan 60 is laid upon the top of the block W, the width of this pan being substantially equal to the open space U shown in the mortar bed in Figure 12. Thereupon mortar may be deposited on top of the pan, and struck off with a screed, filling in the space at either edge between the angles 61 and 62 and the corresponding beads of the side plates 1b and 2d, and filling in transverse layers of mortar over the webs of the blocks, which register with the aforesaid openings. The mortar in the openings runs in under the angles, and when the pan 60 is lifted, there is a pattern of mortar laid on the upwardly facing edges of the blocks upon which blocks such as V may now be set. Thereupon the vertical joints are filled in with mortar, and the blocks V tamped to the right level, as indicated by the flanges 3 and 4 of the side plates. Thereupon the device may be released by breaking the toggle and raising the device and setting it in an advanced position and the setting of further blocks is a repetition of the foregoing.

A similar device may be used for glass blocks or for any other masonry materials. The masonry units in the device of Figure 12 are faced against the face plate 1d which preserves the planar surface of the wall.

In Figure 14 I have illustrated the structure and mode of use of a device for laying a combination brick face and masonry block wall. In this case, the reach is made at each end of a suitable width to embrace the composite wall which consists of bricks on the face, and masonry blocks or units larger than bricks on the back. The locking and unlocking mechanism in this case comprises three toggle links, namely, the central link carrying the grip 32, and end links 28, 28, with toggle pins 29, 29 guided in slots 30, 30 in the two guiding posts 31, 31. The principle is the same as that of the single pair of toggle links, but on the wider construction provides a better balance. The front plate 1e has the three horizontal beads 17, 17, 17 connected by vertical beads 7, 7, 7 suitably offset to break the joints vertically for receiving the courses of bricks S, R and Q. The back plate 2e has a single bead 18 at the horizontal joint between the lower block W and the block V in the course being laid. In the use of this device, it is first set into place, and then the mortar bed pan 60 shown in Figure 13 is placed over the blocks in the course W. A screed such as shown in Figure 3 is then employed to spread the mortar evenly over the exposed area of the block W and over the block T at the face of the wall. Thereby, except for the space occupied by the fillers 64, 65 and 66, in the device 60, mortar is spread to an even depth between the side plates and from end to end. Masonry ties, such as 55, may now be laid in place, and the masonry block V is set in place facing the plate 2e. Next the lower brick course S is laid and the vertical joints filled with mortar. Then a layer of mortar on top of the course S is laid, and leveled with the screed. The middle course of bricks R is then set against the face plate and on the mortar bed previously laid, and the vertical joints are filled in. Then a bed of mortar is laid on top of the course of bricks R and is leveled with the screed, and finally the top course of bricks Q is laid and the vertical joints filled in. Then the vertical joints between the blocks in the course V is filled in and the device is removed and the operation repeated.

Figure 15:
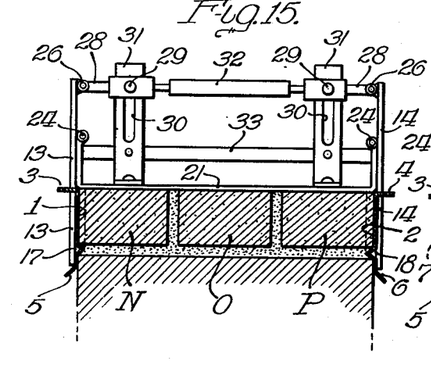
Figure 15 is a cross sectional view of a form of the device suitable for laying bricks into a 12" wall.

In Figure 15 I have shown a modified form of device for laying a 12 inch brick wall of solid construction. The reach and locking mechanism, because of the width of the device, is constructed in the same manner as that of the device shown in Figure 14. The main face plates 1 and 2 and their supporting arms, such as 13 and 14 of Figure 1, with horizontal beads 17, 18, and vertical beads 7, 8 are identical with the construction shown in Figure 1. The use of the device is obvious. The middle row of bricks in the course break the joints with the rows N and P at front and back. The setting of the device on the foundation or on the previously laid course, with the reach at the rear end resting on the bricks laid in the course under construction, and the reach at the front including the end wall and a central filler block at the advance end confine the mortar bed endwise and support the device at the proper level. A suitably dimensioned hopper and screed are used as in connection with the operation of the device shown in Figure 1.

Figure 16:
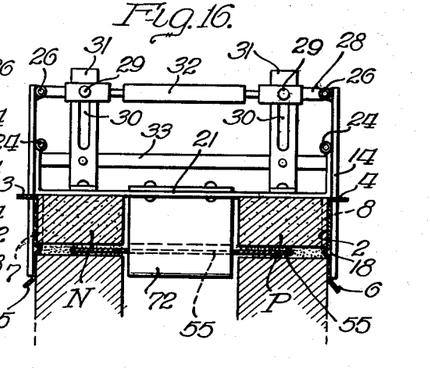
Figure 16 is a similar view of a form of device suitable for laying a 12" hollow core wall.
Figure 17:
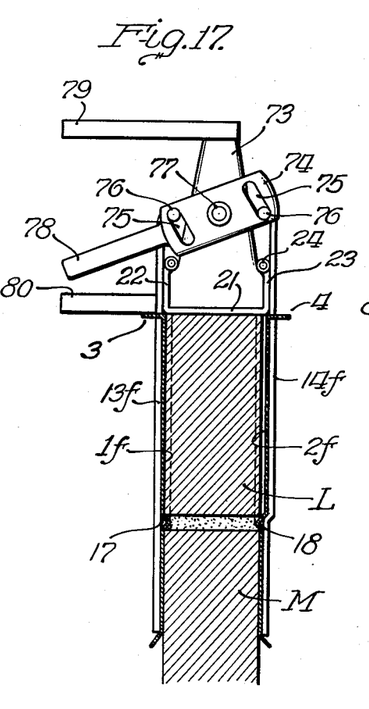
Figure 17 is a similar view of a form of device suitable for setting 4" masonry block or tile into a wall.
Figure 18:
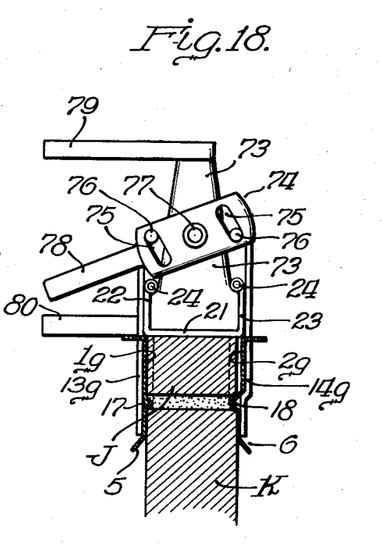
Figure 18 is a similar view of a form of the device of my invention suitable for laying a 4" brick wall.

In Figure 16 I have shown a device for laying a 12-inch hollow core wall where the middle row of bricks O shown in Figure 15 is omitted. In this construction, the device which is substantially identical with that shown in Figure 15, except for the addition of the continuous central hollow filler plug 72, supported at its ends on the crossbars 21 of the reaches 21, 21. This filler plug 72 may be made as a hollow shell of sheet metal with slots through the side walls thereof at appropriate points for the reception of wall ties 55 by which the front and back portions of the compound wall are tied together. The hollow space between the two walls may be left open if that is desired, or this mode of construction advantageously permits of filling with concrete, reenforcements for which may be periodically inserted, as the building up of the two walls progresses. An advantage of this type of construction is that it permits the walls to be erected for confining a wall of reenforced concrete without requiring wooden forms which always involve delay and additional expense.

Where a wall of only four inch thickness is to be laid, a type of locking structure for locking the arms that carry the plates of the type shown in Figures 17 and 18 may be provided. In this case, the reach is required to be only substantially four inches long, and central space for the location of suitable grips and the locking mechanism is not readily available. In this construction, the transverse bar 21 of the reach has its ends bent up at 22 and 23 as in Figure 1. Said upturned ends 22 and 23 are hinged as at the hinges 24 to the side bars 13f and 14f which carry the face plates 1f and 2f. In the construction shown in Figure 17, the back plate 2f is offset so as to provide about ¼ inch clearance with the block L which is to be set in place on the previously laid course blocks M. The upper ends of the arms 13f and 14f have pins 76 which play in slots 75, 75 of a cam plate 74, pivoted at 77 on the bracket 73 attached to the bar 21. The cam plate 74 has an operating handle 78 which may be tilted down, as shown in Figure 17, to cause the slots 75, which are in reality box cams, to force the pins 76 on the upper ends of the arms away from each other, and thereby close the arms against the vertical portions 22, 23 of the cross bar 21 to hold the plates 1f and 2f in vertical position and locked in that position. Convenient hand grips or handles 79 at each end adjacent the handle 78 permit the convenient raising of the handles 78 by grasping the handles 78 with the fingers and the handles 79 with the thumbs to cam the pins 76, 76 towards each other, and thereby to swing the arms in such a manner as to separate the plates from each other to disengage them from the wall. The handle 80 similarly is in suitable position to permit the operator's hand to pull the handles 78 and 80 together to close and lock the device in closed position. The cam slots 75, 75 have such inclination as to be self-locking against spreading force between the plates 1f and 2f. As shown in Figure 17 a course of blocks l which may be substantially 4 inches in horizontal thickness and substantially twice that dimension in the vertical thickness, are to be laid on a previous course M. The device being mounted in place with the reach 21 at the right hand end resting upon a previously laid block in the course under construction and the other end of the device resting upon an end wall or bulkhead, such as 35. A layer of mortar to form a bed for the blocks L is spread across the tops of the previously laid course, and it is leveled off by means of a suitable screed. The blocks L are then put in place facing against the surface of the plate 1f, and the vertical joints are filled in, and the blocks tamped to level position at the proper height. The device may then be opened up by raising the handle 78, and the operation repeated. The device shown in Figure 18 differs from the device shown in Figure 17 only in the size of the block to be laid. In the case of Figure 18, the block J may be a standard brick and in this instance, the device is adapted for laying a row of bricks end to end in a course to constitute the wall.

Figure 19:
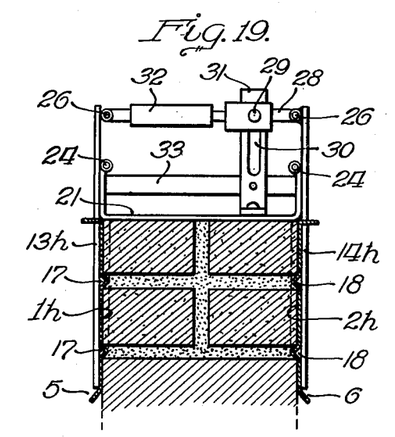
Figure 19 is a similar view of a form of device for laying more than one course of masonry units before removal of the device.

The embodiment of Figure 19 is essentially the same as the embodiment shown in Figure 10, but there is this difference. The device shown in Figure 10 has the side plates 1b and 2b of a height equal to three bricks and two mortar beds between them, and the arms, such as 13b and 14b, which carry these side plates, extend down and rest upon the surface upon which the lintel is constructed. In the model shown in Figure 19, which is adapted for the laying of two courses at a time upon a foundation or upon a previously laid course, the side plates 1h and 2h, and their corresponding carrying arms 13h and 14h extend down to embrace the outside and inside surfaces of the bricks in the course previously laid. The side plates 1b and 2b in Figure 10 may have horizontal flanges resting flat upon the floor, but the flanges 5 and 6 in the device of Figure 19 flare outwardly and downwardly for convenience in applying the device, and for stiffening the lower edge as well. The device of Figure 19 distinguishes from the device of Figure 1 only in the laying of two courses of bricks instead of one. The mechanical details may in other respects be the same or equivalent. Longitudinal beads and vertical beads for the mortar joints are provided.

Figure 20:
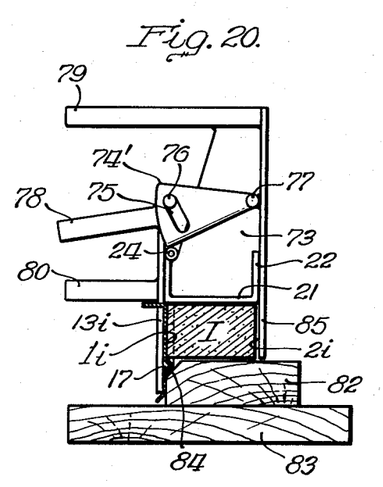
Figure 20 is a similar view of a device of my invention for laying two or more masonry units such as may be employed in a 4" veneer wall on a loading tablet for the purpose of gang laying.
Figure 21:
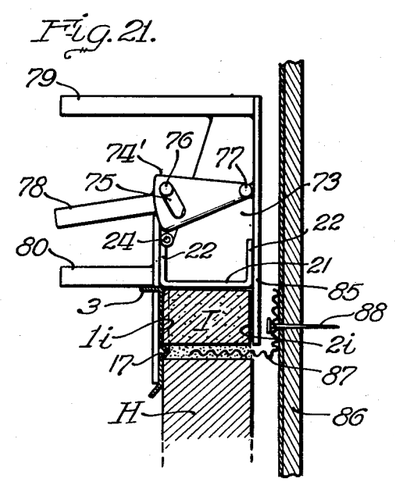
Figure 21 is a similar view of the same device after the gang of masonry units is transferred to a wall.

In Figures 20 and 21, I have shown a gang layer. The theory of this device is substantially different from what has previously been described, and from what is shown in my previous application. The device itself sets a plurality of bricks or building blocks into the wall simultaneously. Whereas, in previous embodiments, the device has guided the placing of bricks or blocks one at a time in proper alignment, the present device physically carries a series of building blocks or bricks in proper alignment so that when they are as a unit deposited upon the bed of mortar in a wall, they are automatically aligned with each other and with the remainder of the wall previously laid.

As shown in the device of Figure 20, a loading block 82 is provided on a base 83. This loading block has its forward outer edge chamfered off as indicated at 84 for the purpose of receiving the horizontal bead 7 of the device to pick up the units I which are lined up on the loading block 82 at substantially the right position and spacing for final alignment in the wall. Thus assume that three bricks are laid end to end on the loading block 82 with space provided between them to make the mortar joint, the device of Figure 20 is lowered over them, and the movable arm 13i and its face plate 1i swung towards the stationary rear plate 2i which is carried on the arms 85 fixedly connected to the reaches and their brackets, 73. The closing of the front plate 1i against the face of the bricks brings the horizontal bead 7 under the forward bottom edges of the bricks and brings the spacing beads 17i which are disposed vertically into the spaces to be maintained between the bricks. The device may then be locked by means of the handle 78 and locking cam and pin 74', 76. The device loaded with the bricks which have been picked up is lifted by means of the handle 79 at each end and deposited upon a bed of mortar spread upon a previously laid course in the wall.

Figure 22:
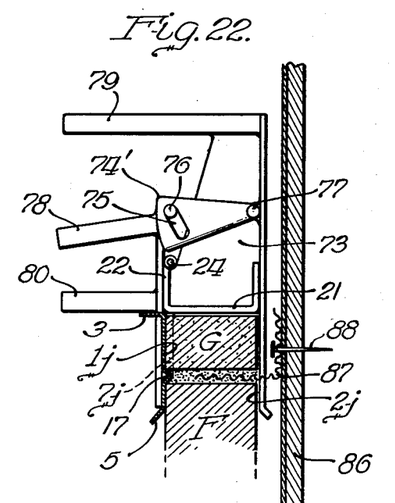
Figure 22 is a cross sectional view of a form of device suitable for laying a 4" veneer wall.

Figure 21 shows the deposit of these bricks upon a veneer wall which is laid in front of and attached to the siding 86 of the wooden parts of the building. A wall tie 87, which has been attached as by means of nails 88 to the siding 86, and the end thereof disposed over the previous course of bricks laid in the wall, serves to tie the siding and the brick wall together. The wall ties which may be pieces of wire screen or expanded sheet metal or the like are first fastened in place and then mortar is deposited upon the top surface of the previously laid wall H. The grasping of the bricks by means of the device shown in Figures 20 and 21 automatically aligns them with respect to each other in the device and deposit of the bricks held in the device aligns them upon the previously laid course H by virtue of the guidance of the machine. When the bricks are thus deposited upon the bed of mortar, the machine is released by pulling up on the handle 78 to swing the movable plate 1i outwardly out of the groove in the mortar, and the device is raised out of the way, and the operation may be repeated. The vertical joints between the bricks thus placed are then filled in, a bed of mortar laid over the bricks, and the operation is repeated. The vertical joints may be filled with mortar while the bricks are still held in the device. This is preferable as it holds the bricks together in alignment while the vertical joints are being filled. Instead of picking up a gang of bricks and laying them, the device with slight modification as shown in Figure 22 may be adapted to the type of operation described in connection with Figure 21. In this case the back plate 2j is a plain plate, but it is slotted at appropriate points to receive the wall tie 87 described in connection with the previous figure. The device is clamped in place on the top of the previously laid course F. A suitable volume of mortar is laid between the side plates on top of the inner ends of the wall ties 87. It is then struck off with a screed of suitable dimensions, and the bricks laid in place upon the bed of mortar. Guided as to spacing and position by the vertical beads 7j, they may then be tamped into place, the vertical joints filled, and the device removed and shifted to repeat the operation. Thus it is apparent that in the device of Figures 20 and 21, the back plate does not confine the back edge of the horizontal mortar bed, whereas the device of Figure 22 does furnish such confinement for the horizontal mortar bed.

Figure 23:
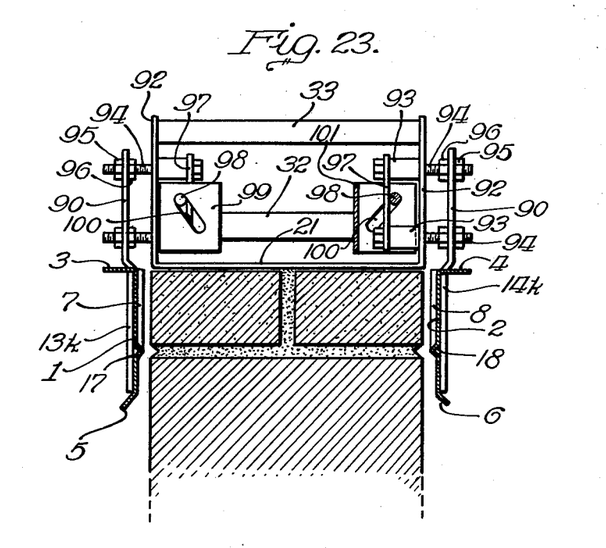
Figure 23 is a transverse cross sectional view of an embodiment of my invention in which the side plates are mounted for parallel motion in and out.

The device shown in Figure 23 is the same as the device of Figure 1, except as to the manner in which the side plates are closed and opened. In this construction the transverse reach has the cross bar 21 with the upturned ends 92, resembling the upturned ends 22, but being of greater extent. These ends are connected at their tops by means of the hand grip 33, and they carry on their inner faces cylindrical guides 93 for guiding the sliding bolts 94. There are two guides 93 on each side of the reach, and two bolts 94 which slide horizontally in the guides and through holes in said upturned portions 92. The outer ends of the said sliding bolts 94 are adjustably connected to the offset vertical ends of the arms 13k and 14k. These offset portions 90, 90 are clamped between threaded nuts 95, 96, so that they move fixedly with the said bolts 94. The inner ends of the bolts 94 are attached as by welding to cross bars 97, and these cross bars carry the pins 98, 98. The movable grip 32 carries the connected parallel slotted plates 99 with the slots 100 registering in the parallel plates, and embracing the ends of the pins 98 on the cross bars 97. The grip 32 is in the form of a round cross bar connecting the two plates which are joined by a bottom wall 101 shown in section at the right of Figure 23. These parallel plates are guided upon the cross bars 97 which are parallel flat pieces. By this means raising of the grip 32 slides the parallel plates vertically upward and pulls the pins 98 towards each other until the offset ends 90 of the arms 13k and 14k rest against the upturned portions 92, 92 of the cross bar 21, locking the side plates in parallel closed position.

The reverse operation of moving the grip 32 down into the position shown in Figure 23 opens the side plates from each other to release the device from the wall. Obviously, by other mechanical expedients, the movement of the plates in and out and the locking of the plates in their closed position may be secured.

The device of Figure 23 is adapted for use in a novel manner of laying bricks. In laying a course of brick the bricks may first be laid by the use of a device such as shown in my prior copending application, Serial No. 93,078, now Patent 2,585,283, with the center vertical joint of the course left unfilled. Then, by applying the device of Figure 23, which has the parallel movement of the side plates 1 and 2 towards each other when the device is closed, the mortar in the mortar bed or horizontal joint may, by means of the beads 17 and 18, be forced into the space provided by the unfilled vertical joint between the bricks. The center joint may then be filled and the bricks in the course embraced by the machine of Figure 23, tamped down to the proper level as determined by the edges 3—4. Where the device for guiding the first operation, namely, laying the bricks into the course, employs the beads for forming the vertical grooves on at least the front face of the wall, the mortar in such grooved joints need not be displaced. The use of the machine of Figure 23 (with the filler blocks 35 and end wall 36 omitted) operating as an aligning and pointing device for final accuracy, may be utilized by the same operator in the second of two successive operations, or the two operations may be performed by two operators with a division of labor between them. The initial laying of the mortar bed and placing of the bricks in position in the course thus constitutes one operation, and the shaping of the mortar joints and filling in of the central vertical joint and leveling off of the bricks in final finished position may be the second operation. The first operation might be performed by hand without the aid of the device of the prior application, but the accuracy of the spacing of the bricks end to end secured by the use of the said device of my prior application is highly desirable. Otherwise the second operation may involve moving of the bricks endwise after they are set in the mortar, which is undesirable if not impractical. This new method of laying masonry units is not claimed herein, but is claimed in my copending application Serial No. 95,297 filed May 25, 1949, now Patent No. 2,630,703, issued March 10, 1953, the present application being directed to the mechanical aid.

Figure 24:
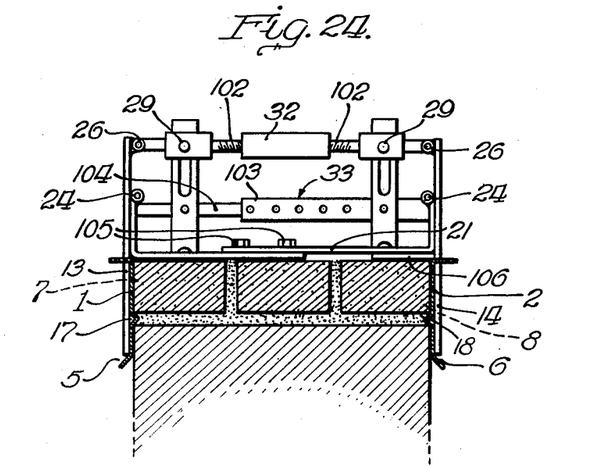
Figure 24 is a cross sectional view showing a form of the device which is adjustable as to width.

In Figure 24 I have indicated the manner in which a certain adjustment of the width of the device of my invention may be secured. The device is substantially the same as that shown in Figure 15, except for the adjustment which may be effected to alter the effective width. This adjustment is effected by having the tubular grip member 32 rotatable on the reverse threads or turnbuckle threads 102, 102 to spread the ends of the link or draw them together. The hand grip 33 is a tubular telescoping sleeve 103 and rod 104 which may be pinned by suitable adjustment holes and cross pins.

The cross bar 21 of the reach is made of overlapping portions which may be adjusted by means of cap screws or other releasable holding devices 105. A suitable filler block 106 at the right hand end of the device assists in supporting the reach in level position at all adjustments.

In each form of the device, a suitable longitudinal spirit level, such as shown at 12 in Figure 1, and a transverse spirit level 11, as shown in the same figure, may be employed to secure the leveling of the device in two directions and consequent leveling of the course of masonry blocks laid by it.

The collapsible connection between the upper ends of the movable arms that carry the side plates, or between the reach and one arm carrying a movable side plate, may, as an alternative to the toggle or cam connection, take the form of a steel strip concaved lengthwise, which may be flexed and collapsed by lateral pressure of the hand of the operator, and which will return to a straight position with a snap action and form a rigid strut between the arms or between an arm and the reach.

It is fundamental in the construction and operation of the present device that the so called "reaches," such as the elements 21 in Figure 1, support the weight of the device at points beyond each end of the clear working space in which the masonry units are to be laid in the course under construction. These reaches are really frame or pedestal units in that they remain stationary and support the weight of the device both during the laying of the gang of units in the clear space between them and during the time that the side plates 3 and 4 are swung outward sidewise to clear the units which have been laid in the said working space. Thus an exceedingly simple and effective one man guide device is provided.

I do not intend to be limited to the specific details shown and described, except as the same are made essential by the appended claims. Various modifications will be made by those skilled in the art.

I claim:

1. A device of the class described comprising a pair of oblong face plates adapted to be brought into parallel vertical planes spaced apart by a distance equal to the thickness of the wall being erected and having their upper longitudinal edges disposed horizontally, upwardly extending arms connected to said plates, a pair of reaches having pivotal connection on horizontal longitudinally extending axes with said arms adjacent the ends of said plates and adjacent the upper edges of said plates, said reaches having shoulders below said pivotal connections constructed and arranged to stop said plates in parallel vertical position, and actuating means comprising collapsible struts connected to said arms above said pivotal connections to said reaches for swinging said plates on said pivotal connections to open and close said plates relative to said stops and to lock the plates against the stops and parallel to each other.

2. The device of claim 2 wherein handles are connected to said reaches, and said collapsible strut at each reach is disposed adjacent the handle whereby it may be engaged by the thumb while the handle is engaged by the fingers of the hand of the operator, said collapsible strut being so constructed and arranged as to be collapsed upon movement of generally the central portion thereof toward said handles.

3. The device of claim 2 wherein the face plates have horizontal inwardly facing beads adapted to lie above the upper front and rear edges respectively of a previously laid course and having horizontal outwardly facing flanges at their upper edges disposed at a common level a distance above the beads substantially equal to the thickness of a masonry unit to be laid, said bead being of a vertical thickness substantially equal to the thickness of the bed of mortar between courses.

4. The device of claim 2 wherein said actuating means for swinging said plates into and out of working position comprises a collapsible toggle, and wherein abutment means are provided above said toggle for engagement by a portion of said toggle when said toggle is in a position slightly over center in a direction upwardly of said reaches, whereby said toggle is self-locking when it is in extended position and the plates are in parallel vertical position.

5. A device of the class described comprising a pair of flanged face plates disposed in parallel vertical planes with their upper edges horizontal, said plates being adapted to lie in spaced parallel aligned relation with their flanges extending outwardly, a plurality of pairs of vertically extending arms, said arms being attached to the outsides of the plates, a reach extending between each pair of arms and having horizontal pivotal connection with the arms intermediate their ends stop means on said reaches disposed in vertical alignment with said pivotal connections for engaging said arms to stop said plates in parallel vertical position, and self-locking actuating means connected to the upper ends of the arms for moving them in and out relative to each other said self-locking actuating means locking the arms against the stops with the plates in parallel vertical position.

6. The device of claim 5 wherein the actuating means is a toggle having a knuckle pin and the reach has a guiding post guiding said knuckle pin in a vertical line to ensure predetermined angular motion of said arms about their pivotal connections on the reach.

7. In a device of the class described, the combination of a pair of oblong parallel guiding plates, reaches between the plates having wall engaging portions for supporting the device on top of the wall, means on said reaches and on said plates pivotally connecting said reaches and said plates on axis extending longitudinally of said plates, said reaches including stop means vertically aligned with the pivotal connections provided by said means to stop said plates in parallel position, and actuating means operatively associated with said plates to the side of said pivotal connections opposite said stop means for moving the plates away from and toward the reaches said operating means being self-locking to hold the plates in parallel position.

8. In a device of the class described, the combination of a pair of face plates, vertically disposed arms connected to said plates, a pair of reaches each reach comprising shoulders at opposite sides and hinge portions above said shoulders, said arms having hinge portions intermediate their ends connected to the hinge portions on said reaches, and toggle connections between the upper ends of adjacent pairs of arms for locking said arms against said shoulders.

9. In a device of the class described, the combination of a pair of face plates, vertically disposed arms connected to said plates, a pair of reaches each reach comprising a flat horizontal bar with upturned ends terminating in a hinge portion, said arms having hinge portions intermediate their ends connected to the hinge portions on said reaches, and self-locking camming means between the upper ends of the arms for locking the arms in vertical position against said upstanding ends of the reaches.

10. In a device of the class described, the combination of a pair of face plates, arms connected to said face plates, said arms being disposed generally vertically, a pair of reaches pivoted to said arms intermediate their length, a toggle connection between the upper ends of adjacent pairs of arms, each toggle consisting of two toggle links of unequal length and a vertical guiding post supported on the adjacent reach for guiding the toggle joint vertically.

11. In a device of the class described, the combination of a pair of face plates adapted to be disposed in substantially vertical planes and having substantially horizontal upper edges, vertically disposed arms connected to the ends of said face plates, a pair of reaches pivotally connecting said arms, means for locking said arms in substantially vertical position with the face plates disposed in substantially parallel position, said reaches having bottom surfaces disposed substantially at the level of the upper edges of said plates, and a vertically disposed supporting member below one of the reaches for supporting said reach above the wall a distance equal to the depth of the course of masonry units under construction.

12. In a device of the class described, the combination of a pair of face plates adapted to be disposed in substantially vertical planes and having substantially horizontal upper edges, vertically disposed arms connected to the ends of said face plates, a pair of reaches pivotally connecting said arms on parallel horizontal axes, means for locking said arms in substantially vertical position with the face plates disposed in substantially parallel position, said reaches having bottom surfaces disposed substantially at the level of the upper edges of said plates, and a vertically disposed plate below one of the reaches and a displacer disposed in front of and at one side of said plate.

13. A device to aid the laying of masonry units comprising the combination of an oblong vertically disposed face plate for aligning a plurality of units with each other and with units previously laid, said face plate having a horizontally disposed upper edge and having a horizontal bead approximately the thickness of a mortar bed and being disposed below the upper edge by a distance substantially equal to the height of a unit to be laid, an oblong vertical back plate substantially parallel with the first plate, reaches disposed between said plates for supporting the device upon the top of the wall, a pair of arms connecting the back plate and said reaches, a second pair of arms connecting said face plate and said reaches, one of said pairs of arms being movably mounted on said reaches for movement with respect thereto, and actuating means for moving said movable arms to move the plate carried thereby towards and away from the other plate, said actuating means comprising self locking means for holding the movable arms locked in vertical position.

14. In combination, a pair of reaches, a pair of guide plates movably mounted on said reaches to move toward and away from each other, manual operating means for moving said guide plates, said operating means locking the plates when they are in a predetermined inward position, and an offset filler block supported on one of said reaches and closing the end of the space between said side plates when said plates are in their inward position nearest each other, said block supporting the associated reach upon the top of the wall, said block being of a height substantially equal to the height of the masonry course under construction.

15. In combination in a device of the class described, a pair of oblong plates adapted to be disposed in parallel vertical planes, said plates being of a depth not less than the height of a course of masonry units being laid, arms mounted on the outside of the plates near their ends, and extending above the plates, a pair of transversely disposed reaches, each reach being hinged to a pair of arms, said hinges having horizontal axes and being disposed intermediate the length of said arms, said reaches being adapted to rest upon and be supported by the wall under construction, the front reach having a downward extension with its supporting surface disposed below the supporting surface of the rear reach by a distance equal to the height of a course of masonry units under construction, stop means on the reaches for stopping the angular motion of said arms when the plates are in parallel vertical position, and actuating means for swinging said arms about said hinges, said actuating means being self-locking when the plates are stopped in parallel vertical position.

16. In combination, a front plate adapted to be supported upon a wall in course of construction with the upper edge horizontal, the plate having a horizontally extending bead along its lower margin, the bead being spaced a distance below the upper edge by a distance substantially equal to the height of the masonry units with which the device is to be employed, a pair of vertical arms attached to the plate near the ends of the same, transversely extending reach members disposed horizontally at substantially right angles to the plate, said reach members being hinged at their front ends to said arms so that the plate may be swung away from the wall, said reaches being adapted to be supported on the wall under construction and having stops lying in the paths of the arms to stop the arms with the plate in vertical position, wall engaging means connected to the rear ends of the reaches for engaging the inner side of the wall, and a pivotally mounted actuating member for swinging the front plate about its hinges, said actuating member being self-locking when the arms are swung against the stops.

17. In combination, a pair of reaches adapted to be supported upon the wall under construction, said reaches having hinged parts disposed at substantially the same level as one another, a pair of parallel guide plates having hinged parts hinged to the hinged parts disposed on said reaches, means for simultaneously swinging said plates on said hinges outwardly relative to said reaches, and downwardly extending supporting means on each of said reaches, one of said supporting means terminating at a level below the other by a distance equal to a course of masonry units under construction.

18. In combination, a pair of reaches having pivots in horizontal alignment, a plate having vertically disposed arms hinged to said reaches on said pivots, stop means in said reaches in vertical alignment with said pivots for stopping said arms when the plate is in vertical position, said reaches being disposed at substantially the same horizontal level, said reaches when in use extending across and being supported upon the top of the wall under construction, one of said reaches being supported upon masonry units laid in the course under construction, the other reach having a wall engaging support member extending downwardly a distance equal to the height of the course under construction, and being supported upon the course previously laid, and pivoted actuating means connected to said arms for swinging said arms and the connected plate on said hinges, said actuating means being so constructed and arranged as to be self-locking when the arms are swung against the stops on the reaches.

19. In combination a rear reach having downwardly facing wall engaging means, a front reach having downwardly facing wall engaging means disposed at a level below the first wall engaging means by a distance equal to the height of a course of masonry units being laid, a pair of parallel side plates, connecting means operatively associated with the plates and the reaches at each end of the plates and connecting the plates for movement with respect to the reaches, manually operable actuating means operatively associated with said plates for moving the plates with respect to said reaches and away from each other to release the plates from masonry units deposited on the wall between them, and said reaches having stop means for cooperation with said actuating means to hold the plates in a predetermined parallel position.

20. In combination a pair of parallel vertical guide plates facing each other, each plate comprising a horizontally disposed outwardly facing flange at its upper margin, and an inwardly extending bead of a vertical height substantially equal to the thickness of a motor bed at the lower edge thereof, the height of the plates above the bead being substantially equal to the vertical thickness of masonry units to be laid, vertically extending mounting arms connected to the ends of each of the plates and extending above the same, arms having hinge parts above said plates, a pair of transverse reach members each member comprising a horizontal bar with upturned ends disposed substantially vertically and each upturned end having a hinge part pivoted to the hinge part of one of the arms and each said upturned end being adapted to engage the arm and hold the same substantially vertical, and expansible and contractible arm actuating means connecting each pair of arms to swing the same about said hinges, said actuating means being self-locking when the arms are swung into engagement with said upturned ends of the horizontal bars.

21. In a device of the class described, the combination of a pair of side plates, supporting arms connected to the side plates, a pair of spaced apart reaches disposed at the ends of the side plates between the arms at each end of the plates, the arms and reaches being hinged together, inwardly facing beads formed along the lower edges of the plates, supporting means extending down from the reach at one end of the device, said means terminating at substantially the same level as the bottom edge of the beads, said device in use being supported at said one end by engagement of said supporting means with the top of the wall.

PAUL H. SOMMERS.

References Cited in the file of this patent

UNITED STATES PATENTS

| Number | Name | Date |
|---|---|---|
| 929,470 | Neil | July 27, 1909 |
| 1,573,263 | Madden | Feb. 16, 1926 |
| 1,742,103 | Sholtes | Dec. 31, 1929 |
| 2,395,438 | Watkins | Feb. 26, 1946 |
| 2,428,374 | Malthouse | Oct. 7, 1947 |
| 2,462,644 | Kimura | Feb. 22, 1949 |